US011453095B2

(12) United States Patent
Niikura

(10) Patent No.: US 11,453,095 B2
(45) Date of Patent: Sep. 27, 2022

(54) CONTROL DEVICE AND MACHINE TOOL

(71) Applicant: FANUC CORPORATION, Yamanashi (JP)

(72) Inventor: Miho Niikura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 319 days.

(21) Appl. No.: 16/775,548

(22) Filed: Jan. 29, 2020

(65) Prior Publication Data

US 2020/0306910 A1 Oct. 1, 2020

(30) Foreign Application Priority Data

Mar. 28, 2019 (JP) ............................ JP2019-062890

(51) Int. Cl.

| | |
|---|---|
| ***B23Q 15/22*** | (2006.01) |
| ***B23Q 17/22*** | (2006.01) |
| ***G05B 19/4061*** | (2006.01) |
| ***G05B 19/4069*** | (2006.01) |

(52) U.S. Cl.

CPC ......... *B23Q 15/22* (2013.01); *B23Q 17/2208* (2013.01); *G05B 19/4061* (2013.01); *G05B 19/4069* (2013.01); *G05B 2219/35316* (2013.01); *G05B 2219/37237* (2013.01); *G05B 2219/49157* (2013.01)

(58) Field of Classification Search

None

See application file for complete search history.

(56) References Cited

U.S. PATENT DOCUMENTS

| | | | |
|---|---|---|---|
| 5,577,164 | A | 11/1996 | Kaneko et al. |
| 2009/0062955 | A1 | 3/2009 | Ide et al. |
| 2015/0261201 | A1 | 9/2015 | Bretschneider |

FOREIGN PATENT DOCUMENTS

| | | | |
|---|---|---|---|
| EP | 2 031 471 | A2 | 3/2009 |
| JP | H07-219591 | A | 8/1995 |
| JP | 2003-305625 | A | 10/2003 |
| JP | 2006-068865 | A | 3/2006 |
| JP | 2007048014 | A | 2/2007 |
| JP | 2009054043 | A | 3/2009 |
| JP | 2009-116505 | A | 5/2009 |
| JP | 2010-231737 | A | 10/2010 |
| JP | 2011-002656 | A | 1/2011 |

OTHER PUBLICATIONS

Japanese Office Action dated Jul. 6, 2021, in connection with corresponding JP Application No. 2019-062890 (7 pp., including machine-generated English translation).

Japanese Search Report dated Jun. 30, 2021, in connection with corresponding JP Application No. 2019-062890 (22 pp., including machine-generated English translation).

*Primary Examiner* — Sean Shechtman

(74) *Attorney, Agent, or Firm* — Maier & Maier, PLLC

(57) ABSTRACT

A control device includes: a storage unit that stores a working program and a tool length correction amount; a control unit that causes a table and a spindle to relatively move on the basis of the working program and the tool length correction amount; a region setting unit that sets an interference checking region including a tool held by the spindle on the basis of the tool length correction amount; and an interference determination unit that determines whether the interference checking region interferes or not with obstacles in surroundings of the tool in a case in which the tool and the table are caused to relatively move on the basis of the working program and the tool length correction amount.

8 Claims, 7 Drawing Sheets

CONTROL DEVICE AND MACHINE TOOL

CROSS-REFERENCE TO RELATED APPLICATIONS

This application claims the benefit of Japanese Patent Application No. 2019-062890, the content of which is incorporated herein by reference.

FIELD

The present invention relates to a control device and a machine tool.

BACKGROUND

In the related art, a machine tool that has an interference checking function in order to prevent the respective portions of a tool, a table, a jig, a workpiece, and the like from unintendedly interfering with each other is known (see Japanese Unexamined Patent Application, Publication No. 2010-231737; Japanese Unexamined Patent Application, Publication No. 2009-116505; and Japanese Unexamined Patent Application, Publication No. 2003-305625, for example).

SUMMARY

According to an aspect of the present disclosure, there is provided a control device of a machine tool that includes a table to which a workpiece is secured and a spindle that holds a tool, the control device including: a storage unit that stores a working program and a tool length correction amount; a control unit that causes the table and the spindle to relatively move on the basis of the working program and the tool length correction amount; a region setting unit that sets an interference checking region including the tool held by the spindle; and an interference determination unit that determines whether the interference checking region interferes or not with obstacles in surroundings of the tool in a case in which the tool and the table are caused to relatively move on the basis of the working program and the tool length correction amount, wherein the region setting unit sets the interference checking region on the basis of the tool length correction amount.

DETAILED DESCRIPTION

Figure 1:
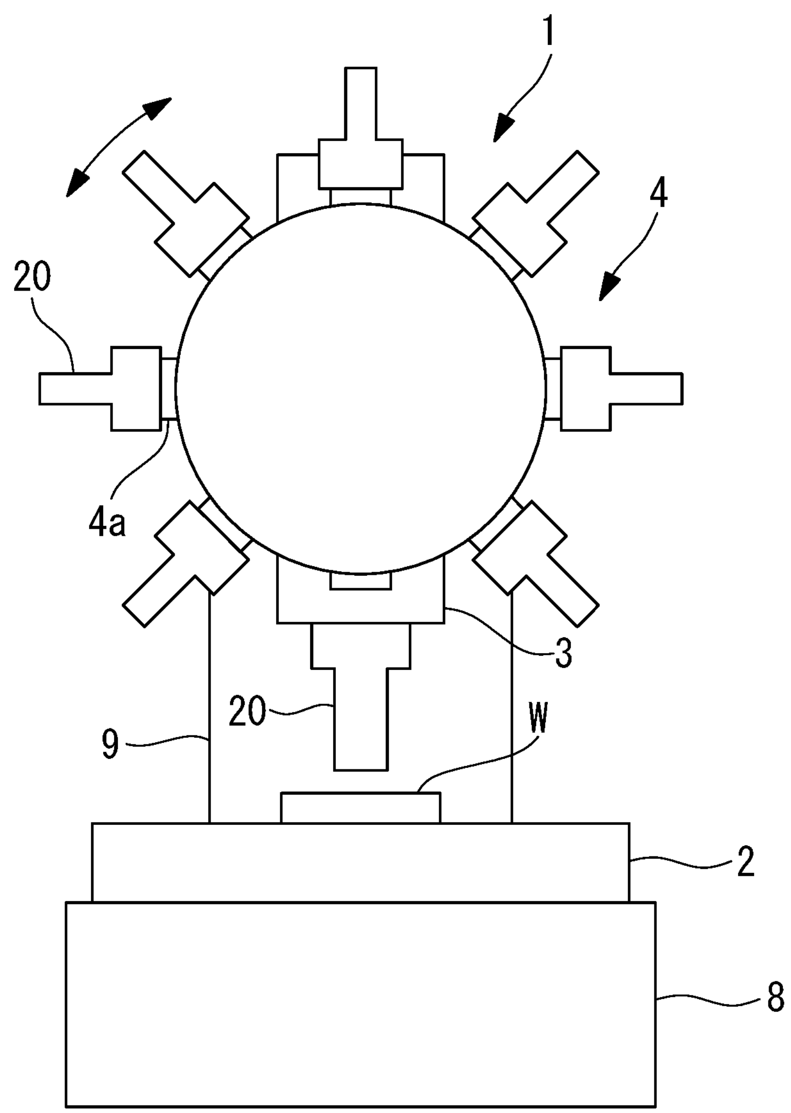
FIG. 1 is a front view of a machine tool according to an embodiment.
Figure 2:
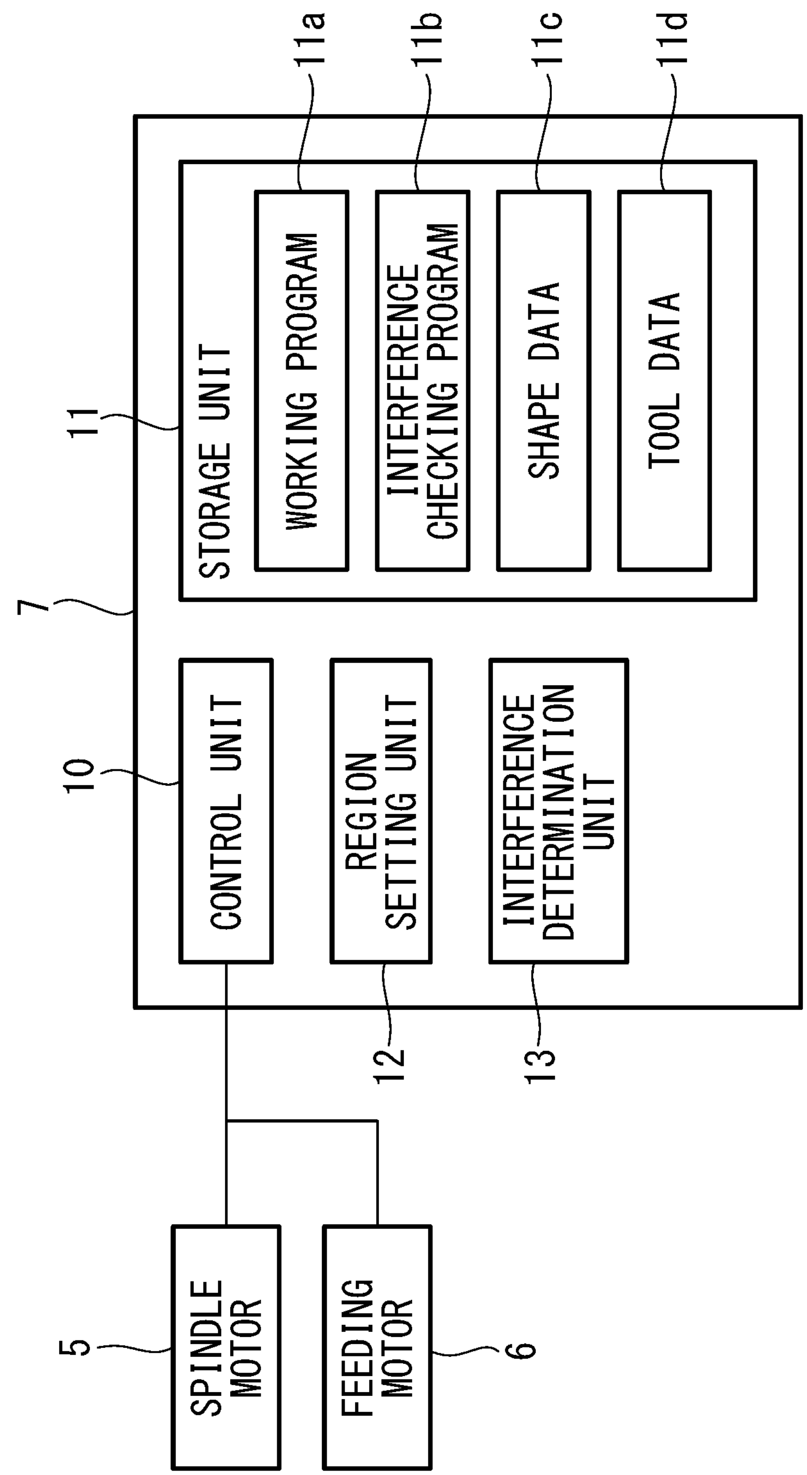
FIG. 2 is a block diagram of the machine tool in FIG. 1.

Hereinafter, a machine tool 1 according to an embodiment will be described with reference to the drawings. The machine tool 1 includes a table 2 to which a workpiece W is secured, a spindle 3 that holds a tool 20, and a tool magazine 4 that accommodates a plurality of tools 20 as illustrated in FIG. 1. The machine tool 1 further includes a spindle motor 5 that causes the spindle 3 to rotate about a longitudinal axis of the spindle 3, a plurality of feeding motors 6 that cause the table 2 and the spindle 3 to relatively move, and a control device 7 that controls the spindle motor 5 and the feeding motors 6 as illustrated in FIG. 2.

Figure 3:
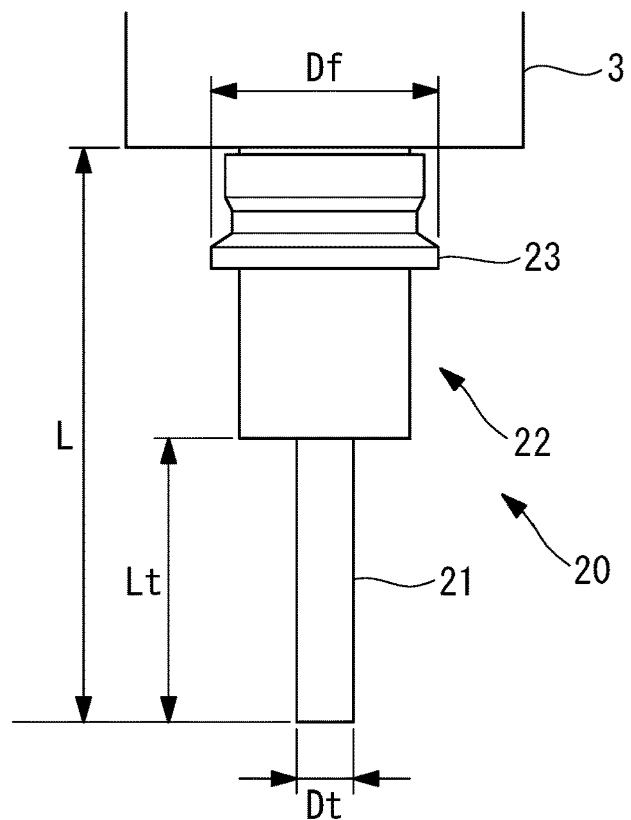
FIG. 3 is a view for explaining parameters related to the tool.

Each tool 20 includes an edged tool portion 21 that comes into contact with the workpiece W and works the workpiece W, and a holder portion 22 that holds a proximal end portion of the edged tool portion 21 as illustrated in FIG. 3. The edged tool portion 21 has various shapes and dimensions in accordance with types. The holder portion 22 includes a flange portion 23 projecting outward in a radial direction and typically has a maximum diameter at the flange portion 23. The shape and the dimension of the flange portion 23 are determined by standards and are common among the plurality of tools 20. The holder portion 22 is held by the spindle 3 at a shank portion that is closer to the proximal end side than the flange portion 23 is.

The tool magazine 4 is a turret type, for example. The machine tool 1 has an automatic tool replacing function which automatically replaces the tools 20 between the tool magazine 4 and the spindle 3. The tool magazine 4 has a plurality of tool holding portions 4*a* capable of respectively holding the tools 20. A tool identification unit such as an RFID that reads identification information of the tools 20 in the respective tool holding portions 4*a* is provided at the tool magazine 4. The identification information of the tools 20 is transmitted from the tool identification unit to the control device 7 and is then associated with positions of the tool holding portions 4*a* and stored in a storage unit 11. The identification information of the tools 20 in the respective tool holding portions 4*a* may be input to the control device 7 by an operator.

The spindle motor 5 is a spindle motor, for example, and is connected to the spindle 3. The feeding motors 6 are servo motors, for example, and cause the table 2 and the spindle 3 to relatively move in a Z direction along a longitudinal axis of the tools 20 and an XY direction that perpendicularly intersects with the longitudinal axis of the tool 20. In the example in FIG. 1, the XY direction is a horizontal direction, while the Z direction is a vertical direction, and the feeding motors 6 include two first feeding motors that cause the table

2 to move in the horizontal direction and a second feeding motor that causes the spindle 3 to move in the Z direction. The first feeding motors are provided at a bed 8 that supports the table 2, and the second feeding motor is provided at a column 9 that supports the spindle 3.

The control device 7 includes a control unit 10 that has a processor and the storage unit 11 that has a RAM, a ROM, other non-volatile memory, and the like. The storage unit 11 stores a working program 11*a*, an interference checking program 11*b*, shape data 11*c*, and tool data 11*d*. The control unit 10 transmits control commands to the spindle motor 5 and the feeding motors 6 in accordance with the working program 11*a*. The spindle motor 5 causes the spindle 3 to rotate in accordance with the control command, and the feeding motors 6 cause the table 2 and the spindle 3 to relatively move in accordance with the control command. In this manner, the spindle motor 5 and the feeding motors 6 execute operations based on the working program 11*a*, and the edged tool portion 21 of the tool 20 held by the spindle 3 works the workpiece W on the table 2.

The shape data 11*c* includes three-dimensional shape data of obstacles that are disposed in the surroundings of the tool 20 held by the spindle 3 and are present within a moving range of the tool 20. For example, the obstacles include the table 2, a jig provided at the table 2, and the workpiece W placed at the jig. The tool data 11*d* includes tool maximum diameters and tool length offsets (tool length correction amount). The tool maximum diameters are maximum diameters of the tools 20 that are able to be attached to the spindle 3 and are fixed values determined in accordance with a specification, such as a diameter, of the spindle 3. The tool maximum diameters are set in the tool data 11*d* by the operator using an input device connected to the control device 7 or are set in advance in the tool data 11*d*.

The tool length offsets are, for example, distances in the Z direction between the table 2 and a distal end of the tool 20 held by the spindle 3 when the table 2 and the spindle 3 are disposed at an origin position. In the case of the example in FIG. 1, the tool length offset is a distance in the vertical direction from an upper surface of the table 2 to a lower end of the tool 20. For example, the tool data 11*d* includes a correspondence table representing a correspondence between identification information and tool length offsets of the tools 20. By the operator's input of the tool length offset to the correspondence table using the input device, a tool length offset is set before the working program 11*a* is executed.

A tool length L differs for each tool 20. The tool length L is a length in the Z direction from a reference surface of the spindle 3 to a distal end of the edged tool portion 21 as illustrated in FIG. 3. The reference surface is a gauge surface that has a diameter of the tapered shank portion of the holder portion 22 as a predetermined reference diameter or a distal end surface of the spindle 3, for example. Also, the tool length L, even if it is of the same tool 20, may change due to abrasion or the like. The tool length offsets are parameters used for correcting variations in the tool length L in position control of the spindle 3 in the Z direction based on the working program 11*a* and are parameters necessary for executing the working program 11*a*.

The control device 7 includes a region setting unit 12 that sets an interference checking region A including the tool 20 held by the spindle 3 and an interference determination unit 13 that determines whether the interference checking region A will interfere or not with the obstacles. The region setting unit 12 and the interference determination unit 13 respectively include processors and execute the following processing in accordance with the interference checking program 11*b*. The interference checking program 11*b* is executed in synchronization with the working program 11*a*.

Figure 4:
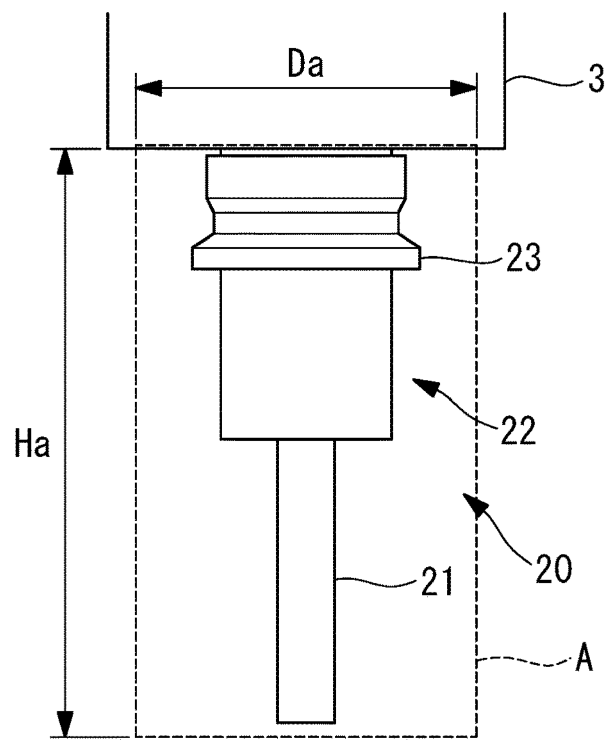
FIG. 4 is a view illustrating an example of an interference checking region set on the basis of a tool length correction amount.
Figure 5:
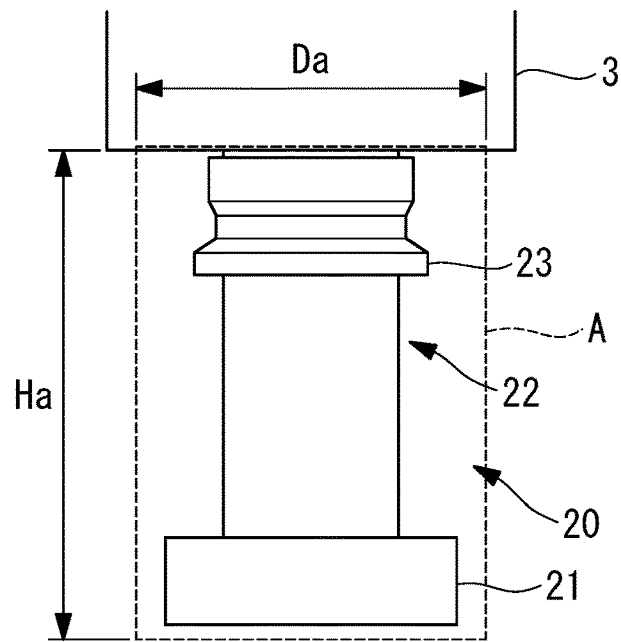
FIG. 5 is a view illustrating another example of the interference checking region set on the basis of the tool length correction amount.

The region setting unit 12 acquires identification information of the tool 20 that is currently held by the spindle 3 from the control unit 10 and reads the tool data 11*d* from the storage unit 11. Next, the region setting unit 12 sets the interference checking region A including an entire portion disposed on the outside of the spindle 3 in the tool 20 on the basis of the tool data 11*d* of the tool 20 that is currently held by the spindle 3. FIGS. 4 and 5 illustrate examples of the interference checking region A. The interference checking region A is a single region with a cylindrical shape that is obtained by simplifying the shape of the tool 20 and has a height Ha in the Z direction and a diameter Da in the XY direction. The region setting unit 12 sets the height Ha on the basis of the tool length offset and sets the diameter Da on the basis of the tool maximum diameter. For example, the diameter Da is a value obtained by adding a predetermined margin width to the tool maximum diameter, and the height Ha is a value obtained by adding a predetermined margin width to the tool length L calculated from the tool length offset. The region setting unit 12 acquires the shape data 11*c* from the storage unit 11 and sets an obstacle region including obstacles on the basis of the shape data 11*c*.

The interference determination unit 13 determines whether the interference checking region A will interfere or not with the obstacle region in a case in which the table 2 and the spindle 3 are caused to relatively move in accordance with the working program 11*a*. For example, the interference determination unit 13 calculates positions of the interference checking region A and the obstacle region at each clock time within a predetermined period of time from the current time and determines whether the interference checking region A will interfere or not with the obstacle region at each clock time. Here, the interference means an interference between the interference checking region A and the obstacle region due to unintended contact between the tool 20 and some obstacles other than contact between the edged tool portion 21 and the workpiece W. The interference determination unit 13 transmits an interference detection signal to the control unit 10 in a case in which it is determined that interference will occur, and the interference determination unit 13 does not transmit the interference detection signal to the control unit 10 in a case in which it is determined that no interference will occur. The control unit 10 responds to the interference detection signal and performs interference avoidance control for avoiding interference between the tool 20 and some obstacles. The interference avoidance control is reducing of a moving speed, stopping, or changing of trajectories of the table 2 and the spindle 3, for example.

Next, an operation of the machine tool 1 will be described. The control unit 10 causes the tool 20 to rotate and causes the workpiece W and the tool 20 to relatively move by controlling the spindle motor 5 and the feeding motors 6 in accordance with the working program 11*a*, thereby executing the working of the workpiece W using the tool 20.

In parallel with the working of the workpiece W, the region setting unit 12 and the interference determination unit 13 execute interference checking between the tool 20 and the obstacles in accordance with the interference checking program 11*b*. Specifically, the region setting unit 12 reads the tool maximum diameter and the tool length offset of the tool 20 that is currently held by the spindle 3 from the tool data 11*d* stored in the storage unit 11 and sets the interference checking region A. Also, the region setting unit 12 reads the shape data 11*c* of the obstacles stored in the storage unit 11 and sets the obstacle region. The region setting unit 12 sets the interference checking region A again every time the tool 20 held by the spindle 3 is replaced.

The interference determination unit 13 determines whether the interference checking region A will interfere or not with the obstacle region in a case in which the table 2 and the spindle 3 relatively move on the basis of the working program 11*a*. In a case in which it is determined that the interference checking region A will not interfere with the obstacle region, the control unit 10 continues the relative movement of the table 2 and the spindle 3 based on the working program 11*a*. On the other hand, in a case in which it is determined that the interference checking region A will interfere with the obstacle region, the control unit 10 performs the interference avoidance control in response to the interference detection signal from the interference determination unit 13. For example, the control unit 10 reduces the moving speed of the table 2 and the tool 20, stops the table 2 and the tool 20, or evacuates the tool 20 up to a position at which the tool 20 does not come into contact with the obstacles by controlling the spindle motor 5 and the feeding motors 6.

It is possible to express simple shapes of the tools 20 with a single cylinder or combinations of a plurality of cylinders except for special tools such as an angle tool. In general, it is not necessary for the interference checking region A to precisely express outer shapes of the tools 20, and the interference checking region A may be any region that is larger than the tools 20 and includes the tools 20. Such an interference checking region A can be set using the diameter Da and the height Ha.

Here, according to the embodiment, the diameter Da and the height Ha are set on the basis of the tool maximum diameters and the tool length offsets stored in the storage unit 11. The tool length offsets are parameters necessary for executing the working program 11*a* and are set in the control device 7 regardless of whether or not to perform the interference checking. In other words, it is not necessary for the operator to set parameters relates to the shapes of the individual tools 20 merely for the interference checking. Therefore, it is possible to reduce time and efforts required for setting the shapes of the tools 20 and to easily set the interference checking region A even for working using a plurality of tools 20.

Although the region setting unit 12 sets the diameter Da of the interference checking region A on the basis of the tool maximum diameter in the aforementioned embodiment, the region setting unit 12 may set the diameter Da of the interference checking region A on the basis of the diameter of the spindle 3 instead. Also, the tool length offset may be a value other than the distance between the table 2 and the distal end of the tool 20, for example, a length in the Z direction from the reference surface of the spindle 3 to the distal end of the edged tool portion 21, in the aforementioned embodiment.

Although the region setting unit 12 sets the interference checking region A on the basis of the combination of the tool length offset and the tool maximum diameter in the aforementioned embodiment, the interference checking region A may be set on the basis of a combination of the tool length offset and another parameter instead. FIGS. 6 to 11 illustrate other examples of the interference checking region A.

Figure 6:
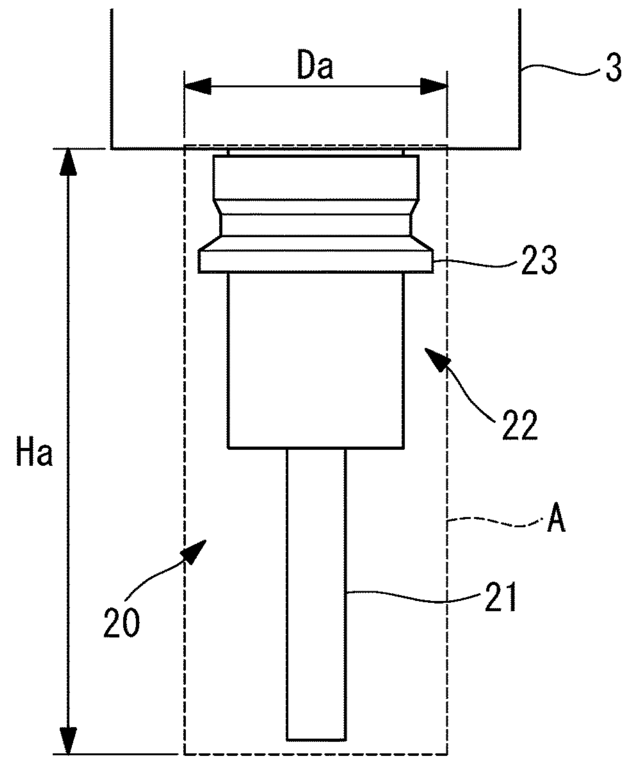
FIG. 6 is a view illustrating an example of an interference checking region set on the basis of a tool length correction amount and a tool diameter correction amount.
Figure 7:
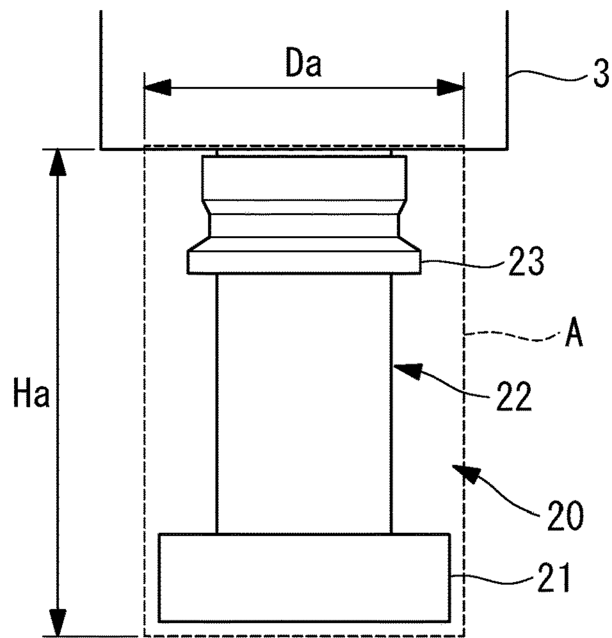
FIG. 7 is a view illustrating another example of the interference checking region set on the basis of the tool length correction amount and the tool diameter correction amount.

In the examples in FIGS. 6 and 7, the interference checking region A is a region with a single cylindrical shape. The tool data 11*d* includes tool length offsets, tool diameter offsets (tool diameter correction amounts), and a flange diameter Df. The tool diameter offsets are diameters or radii of the edged tool portions 21, for example. By the operator's input of the tool diameter offset to the correspondence table using the input device, a tool diameter offset is set before the working program 11*a* is executed, for example. The flange diameter Df is a diameter of the flange portion 23 of the tool 20. The flange diameter Df is a fixed value determined in accordance with specifications of the tool holding portions 4*a* of the tool magazine 4 and is common among all the tools 20. The flange diameter Df is set in the tool data 11*d* by the operator using the input device or is set in advance in the tool data 11*d*.

The region setting unit 12 sets the height Ha on the basis of a tool length offset. Also, the region setting unit 12 calculates a tool diameter Dt from a tool diameter offset and sets the diameter Da on the basis of a larger value out of the tool diameter Dt and the flange diameter Df. The tool diameter Dt is a diameter of the edged tool portion 21 as illustrated in FIG. 3. In a case in which the tool diameter Dt is smaller than the flange diameter Df as illustrated in FIG. 6, for example, the diameter Da is a value obtained by adding a predetermined margin width to the flange diameter Df. On the other hand, in a case in which the tool diameter Dt is larger than the flange diameter Df as illustrated in FIG. 7, the diameter Da is a value obtained by adding a predetermined margin width to the tool diameter Dt.

A maximum value of the diameters of the respective tools 20 is typically either the flange diameter Df or the tool diameter Dt. Therefore, it is possible to set an interference checking region A with a shape that is more similar to an actual shape of the tool 20 by using larger one of the tool diameter Dt and the flange diameter Df instead of the tool maximum diameter for setting the diameter Da. Here, the flange diameter Df is defined by standards and is a common value among all the tools 20 accommodated in the tool magazine 4. The tool diameter offsets are parameters used for correcting variations of the tool diameter Dt in position control of the spindle 3 in the XY direction base on the working program 11*a*. The tool diameter offsets of the tools 20 for working in the XY direction, such as a miller, are set in the control device 7 regardless of whether or not to perform interference checking. In other words, only a small number of parameters related to the shapes of the tools 20 are required to be set by the operator merely for the interference checking.

Figure 8:
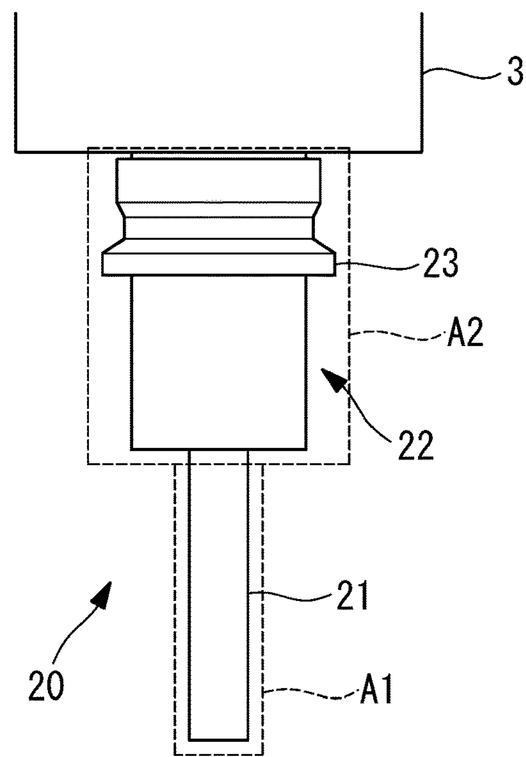
FIG. 8 is a view illustrating an example of an interference checking region set on the basis of a tool length correction amount, a tool diameter correction amount, and a projecting amount of an edged tool portion.
Figure 9:
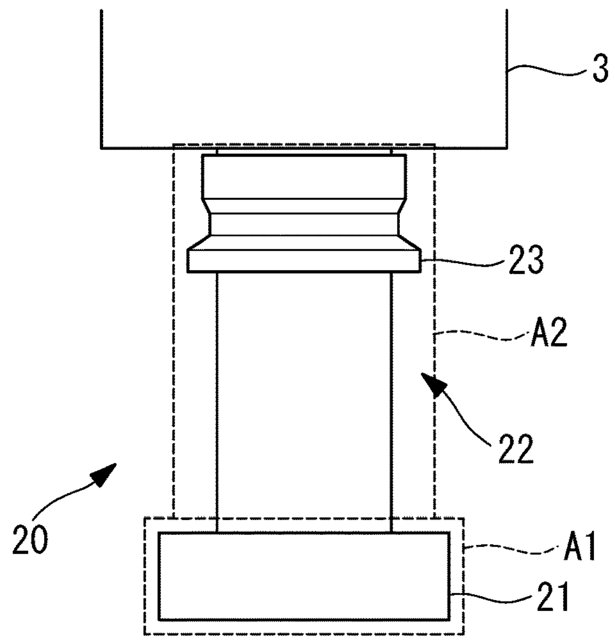
FIG. 9 is a view illustrating another example of the interference checking region set on the basis of the tool length correction amount, the tool diameter correction amount, and the projecting amount of the edged tool portion.

In the examples in FIGS. 8 and 9, the interference checking region is a combination of two regions A1 and A2 with cylindrical shapes. The first region A1 is a region including the edged tool portion 21, and the second region A2 is a region including a part of the holder portion 22 disposed outside the spindle 3. The tool data 11*d* includes the tool length offsets, the tool diameter offsets, the flange diameter Df, and the projecting amounts Lt of the edged tool portions 21. The projecting amounts Lt is the length in the Z direction of the portion projecting from the holder portion 22 of the edged tool portion 21. By the operator's input of the projecting amounts Lt to the correspondence table using the input device, the projecting amounts Lt are set before the working program 11*a* is executed, for example.

The region setting unit 12 sets the height and the diameter of the first region A1 respectively on the basis of the projecting amount Lt and the tool diameter Dt. Also, the region setting unit 12 sets the height of the second region A2 on the basis of a difference between the tool length L and the projecting amount Lt. The region setting unit 12 further sets the diameter of the second region A2 similarly to the diameter Da of the interference checking region A in FIGS.

6 and 7. For considering working conditions, the projecting amount Lt of the edged tool portion 21 is measured in some cases. In such cases, utilization of the projecting amount Lt enables setting of the interference checking regions A1 and A2 with shapes that are more similar to an actual shape of the tool 20.

Figure 10:
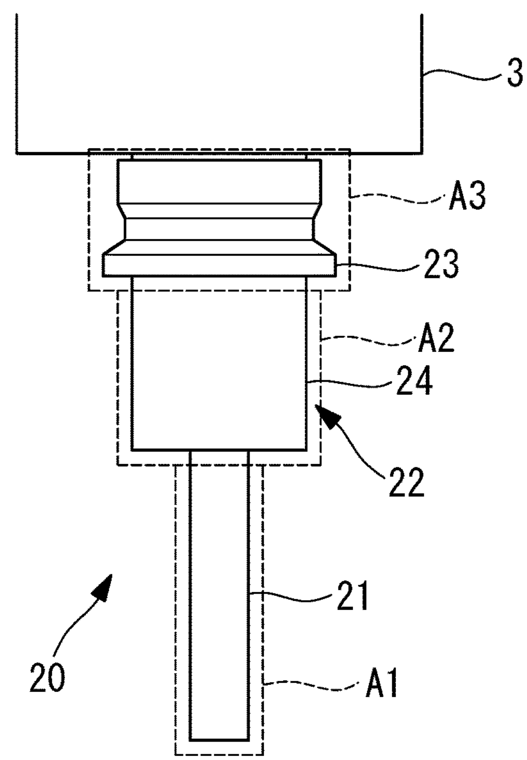
FIG. 10 is a view illustrating an example of an interference checking region set on the basis of a tool length correction amount, a tool diameter correction amount, and a shape data of a holder portion.
Figure 11:
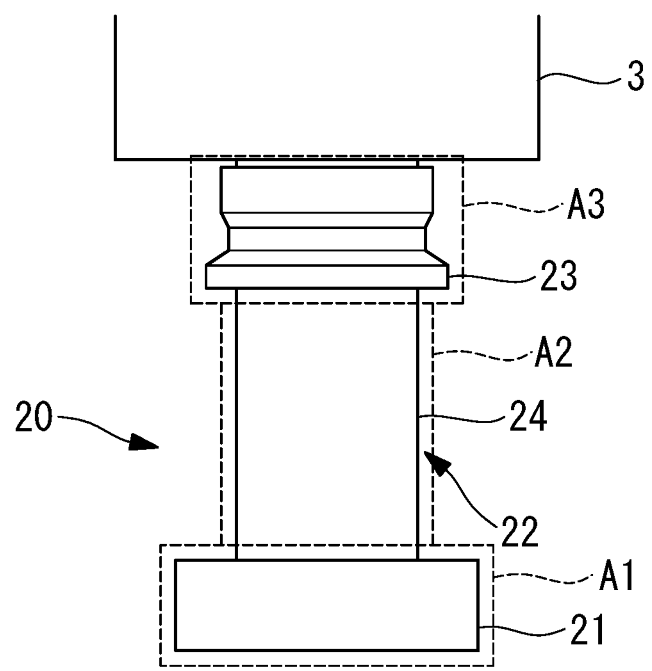
FIG. 11 is a view illustrating another example of the interference checking region set on the basis of the tool length correction amount, the tool diameter correction amount, and the shape data of the holder portion.

In the examples in FIGS. 10 and 11, the interference checking regions are combinations of three regions A1, A2, and A3 with cylindrical shapes. The first region A1 is a region including the edged tool portion 21, the second region A2 is a region including a collet portion 24 of the holder portion 22, and the third region A3 is a region including the flange portion 23 of the holder portion 22. The tool data 11*d* includes the tool length offsets, the tool diameter offsets, and the shape data of the holder portion 22.

The region setting unit 12 respectively sets the height and the diameter of the first region A1 on the basis of the projecting amount Lt and the tool diameter Dt. Also, the region setting unit 12 sets the height and the diameter of the second region A2 and the height and the diameter of the third region A3 on the basis of the shape data of the holder portion 22. The shapes of the holder portions 22 of the plurality of tools 20 are the same in some cases. Further, the shapes of the holder portions 22 do not change due to the working of the workpiece W unlike the shapes of the edged tool portions 21. Utilization of the shape data of the holder portions 22 enables setting of the interference checking regions A1, A2, and A3 with shapes that are more similar to actual shapes of the tools 20.

Although the interference checking region is configured of a single region with a cylindrical shape or a combination of a plurality of regions with cylindrical shapes in the aforementioned embodiment, the interference checking region may be configured of a single region with a polygonal columnar shape or a combination of a plurality of regions with polygonal columnar shapes instead. For example, the interference checking region may be a single region with a square columnar shape or may be a combination of two or three regions with square columnar shapes. In this case, the region setting unit 12 sets the length of one side or a length of a diagonal line instead of the diameter Da on the basis of the tool maximum diameter, the tool diameter offset, or the like.

Although the control device 7 is a numerical value control device of the machine tool 1 that performs interference checking when the tool 20 is working the workpiece W in the aforementioned embodiment, the control device 7 may be a simulation device that simulates whether the tool 20 will interfere or not with obstacles instead. For example, the control device 7 may be a computer for simulation. The tool data 11*d* such as tool length offsets, tool diameter offsets, a flange diameter Df, and a tool diameter Dt is required even in the simulation in order to create models of the tools 20 or execute the working program 11*a*. By using such parameters for setting the interference checking region A, it is possible to reduce time and efforts required for setting the shapes of the tools 20 and to easily set the interference checking region A.

The invention claimed is:

1. A control device of a machine tool that includes a table to which a workpiece is secured and a spindle that holds a tool, the control device comprising:

a processor; and a memory that stores a working program and a tool length correction amount, wherein the tool length correction amount is a distance between the table and a distal end of the tool in a direction perpendicular to a plane defined by the table, wherein the processor is configured to:

cause the table and the spindle to relatively move on the basis of the working program and the tool length correction amount;

set an interference checking region including the tool held by the spindle; and determine whether the interference checking region interferes with obstacles in a region surrounding the tool in a case in which the tool and the table are caused to relatively move on the basis of the working program and the tool length correction amount, wherein the processor is configured to set the interference checking region on the basis of the tool length correction amount.

2. The control device according to claim 1, wherein the interference checking region is configured of one or more regions with cylindrical shapes or polygonal columnar shapes.

3. The control device according to claim 1, wherein the memory further stores a maximum diameter of the tool that is able to be attached to the spindle, and the processor is configured to set the interference checking region on the basis of the tool length correction amount and the maximum diameter of the tool.

4. The control device according to claim 1, wherein the memory further stores a tool diameter correction amount and a diameter of a flange portion of the tool, and the processor is configured to set the interference checking region on the basis of the tool length correction amount, the tool diameter correction amount, and the diameter of the flange portion.

5. The control device according to claim 2, wherein the memory further stores a tool diameter correction amount and a projecting amount of an edged tool portion of the tool, and the processor is configured to set the interference checking region formed of the two regions, on the basis of the tool length correction amount, the tool diameter correction amount, and the projecting amount of the edged tool portion.

6. The control device according to claim 2, wherein the memory further stores a tool diameter correction amount and shape data of a holder portion of the tool, and the processor is configured to set the interference checking region consisted of the three regions, on the basis of the tool length correction amount, the tool diameter correction amount, and the shape data of the holder portion.

7. A machine tool, comprising:

a table to which a workpiece is secured;

a spindle that holds a tool;

a spindle motor that causes the spindle to rotate about a longitudinal axis of the spindle;

a feeding motor that causes the table and the spindle to relatively move; and a control device that controls the spindle motor and the feeding motor, wherein the control device comprises:

a processor; and a memory that stores a working program and a tool length correction amount, wherein the tool length correction amount is a distance between the table and a distal end of the tool in a direction perpendicular to a plane defined by the table, wherein the processor is configured to:

cause the table and the spindle to relatively move on the basis of the working program and the tool length correction amount;

set an interference checking region including the tool held by the spindle; and determine whether the interference checking region interferes with obstacles in a region surrounding the tool in a case in which the tool and the table are caused to relatively move on the basis of the working program and the tool length correction amount, and wherein the processor is configured to set the interference checking region on the basis of the tool length correction amount.

8. A control device of a machine tool that includes a table to which a workpiece is secured and a spindle that holds a tool, the control device comprising:

a processor; and a memory that stores a working program, a tool length correction amount and a maximum diameter of the tool that is able to be attached to the spindle, wherein the processor is configured to:

cause the table and the spindle to relatively move on the basis of the working program and the tool length correction amount;

set an interference checking region including the tool held by the spindle; and determine whether the interference checking region interferes with obstacles in a region surrounding the tool in a case in which the tool and the table are caused to relatively move on the basis of the working program and the tool length correction amount, and wherein the processor is configured to set the interference checking region on the basis of the tool length correction amount and the maximum diameter of the tool.

* * * * *